United States Patent
Burd

(10) Patent No.: US 9,566,921 B2
(45) Date of Patent: Feb. 14, 2017

(54) APPLIANCE INSERT CONNECTION INTERFACE FOR AN AIRCRAFT GALLEY

(71) Applicant: B/E AEROSPACE, INC., Wellington, FL (US)

(72) Inventor: Peter John Leslie Burd, Carmarthenshire (GB)

(73) Assignee: B/E AEROSPACE, INC., Wellington, FL (US)

( * ) Notice: Subject to any disclaimer, the term of this patent is extended or adjusted under 35 U.S.C. 154(b) by 410 days.

(21) Appl. No.: 14/304,074

(22) Filed: Jun. 13, 2014

(65) Prior Publication Data
US 2014/0368030 A1    Dec. 18, 2014

Related U.S. Application Data

(60) Provisional application No. 61/836,459, filed on Jun. 18, 2013.

(51) Int. Cl.
| | |
|---|---|
| *B60R 16/03* | (2006.01) |
| *B64D 11/04* | (2006.01) |
| *B60R 16/023* | (2006.01) |
| *H04J 3/00* | (2006.01) |

(52) U.S. Cl.
CPC ........... *B60R 16/03* (2013.01); *B60R 16/0238* (2013.01); *B64D 11/04* (2013.01); *Y02T 50/46* (2013.01)

(58) Field of Classification Search
CPC ....................................................... H02J 3/00
USPC .......................................................... 307/9.1
See application file for complete search history.

(56) References Cited

U.S. PATENT DOCUMENTS

| | | |
|---|---|---|
| 2005/0121978 A1 | 6/2005 | McAvoy |
| 2006/0060181 A1 | 3/2006 | Sasaki |
| 2010/0050665 A1 | 3/2010 | Oswald et al. |
| 2010/0243800 A1 | 9/2010 | Koschberg et al. |
| 2012/0217343 A1 | 8/2012 | Koschberg et al. |

FOREIGN PATENT DOCUMENTS

| | | |
|---|---|---|
| DE | 102007032052 A1 | 1/2009 |
| EP | 2386811 A2 | 11/2011 |
| JP | S6433485 A | 2/1989 |
| JP | 2003214747 A | 7/2003 |

OTHER PUBLICATIONS

International Search Report, Nov. 13, 2014, 5 pages, from PCT/US2014/042818, published as WO 2014/205013 on Dec. 24, 2014.
International Search Report, May 9, 2014, 5 pages.

*Primary Examiner* — Robert Deberadinis
(74) *Attorney, Agent, or Firm* — Oblon, McClelland, Maier & Neustadt, L.L.P.

(57) ABSTRACT

An electrical connection interface system for a galley insert or appliance for an aircraft galley includes a high level interface configured to be electrically connected with an appliance power and control unit or galley power and control unit. In a presently preferred aspect, the galley insert or appliance may be an oven, refrigerator or chiller.

16 Claims, 1 Drawing Sheet

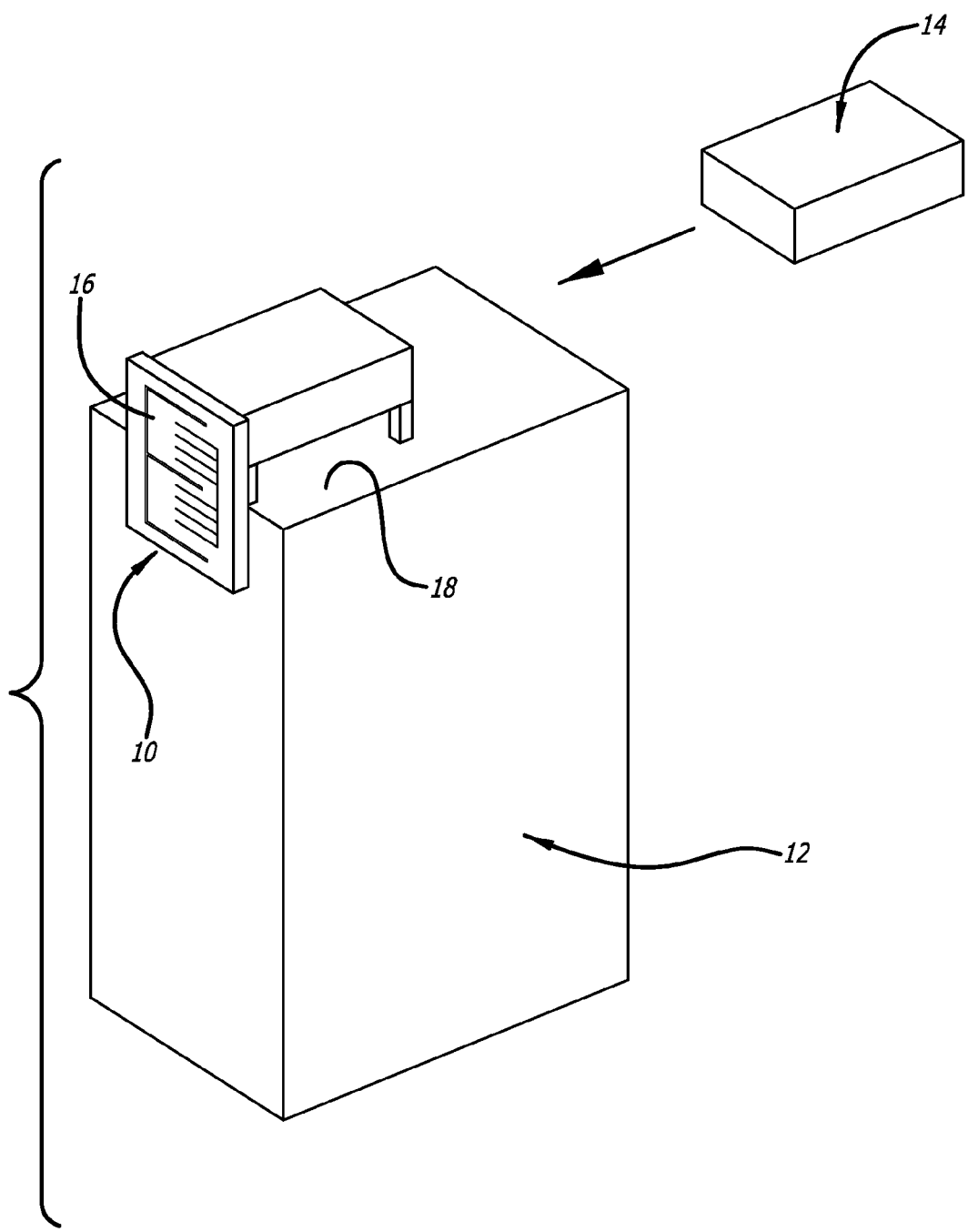

APPLIANCE INSERT CONNECTION INTERFACE FOR AN AIRCRAFT GALLEY

CROSS-REFERENCES TO RELATED APPLICATIONS

This application is based upon and claims priority from U.S. Provisional Application No. 61/836,459, filed Jun. 18, 2013, incorporated by reference in its entirety.

This invention relates generally to transport aircraft galley systems, and more particularly relates to an improved electrical connection interface system for a galley insert or appliance for an aircraft galley.

BACKGROUND

Aircraft galley systems for commercial aircraft with in-flight catering services typically incorporate self-contained refrigeration units that are cooled to prevent spoilage of food prior to distribution to passengers, and to keep beverages at desired serving temperatures, as well as separate ovens for heating food in the preparation of hot meals to be served aboard aircraft. Currently space must be allocated for each of the heating and cooling devices separately, either in the same galley or in different galleys.

Conventional electrical connection interfaces for a galley insert or appliance for an aircraft galley typically involve a large amount of complex internal electrical and other systems, contributing significantly to the length, complexity and weight of such aircraft galley electrical systems, and are subject to possible damage from disconnection due to movement of a galley insert or appliance after an electrical connection interface is completed.

It would be desirable to provide a high level interface that allows a reduction in overall weight of the galley insert or appliance by reducing a length of the internal electric cabling, electromagnetic interference protection and other services. It would also be desirable to provide a high level interface that allows reduction of weight of a galley electrical wiring and data system by significantly shortening a connection length between an appliance power and control unit and the galley insert or appliance, and by shortening a connection length between the appliance power and control unit and a galley power and control unit. It would also be desirable to provide a high level interface that allows a galley insert or appliance to be installed and uninstalled as a conventional line replaceable unit without the need for additional tools. It would also be desirable to provide a high level interface that provides a significant safety separation between the electrical and water systems by placement of such water systems below a level of an interface connection point. It would also be desirable to provide a high level interface that can provide a common electrical interface with different galley insert or appliance types, allowing interchangeability within a given location, and that allows for float in both a galley insert or appliance and an appliance power and control unit preventing damage or disconnection through movement. The present invention meets these and other needs.

SUMMARY OF THE INVENTION

Briefly, and in general terms, the present invention provides for an improved electrical connection interface system for a galley insert or appliance for an aircraft galley that allows a reduction in length and weight of internal electric cabling, electromagnetic interference protection, and data systems by significantly shortening connection lengths between an appliance power and control unit and the appliance, between the appliance power and control unit and a galley power and control unit, and that allows a galley insert or appliance to be installed and uninstalled as a conventional line replaceable unit without the need for additional tools and allows interchangeability, and movement of a galley insert or appliance and an appliance power and control unit without damage or disconnection.

Accordingly, the present invention provides for an improved electrical connection interface system for a galley insert or appliance for an aircraft galley, including a high level interface configured to be electrically connected with an appliance power and control unit or galley power and control unit. In a presently preferred aspect, the galley insert or appliance may be an oven, refrigerator or chiller, for example.

The present invention accordingly provides for an electrical connection interface system for a galley insert for an aircraft galley having a galley power and control unit that supplies electrical power to the galley insert as well as operational control for the galley insert. The electrical connection interface system includes a galley insert, an appliance power and control unit configured to be connected to a galley power and control unit to supply electrical power and operational control to the galley insert, and a high level interface removably connected in electrical communication with the galley insert and configured to provide electrical power to the galley insert and operational control of the galley insert. In a presently preferred aspect, the high level interface is mounted at a top rear portion of the galley insert.

In another presently preferred aspect, the galley insert may be an oven, a refrigerator or a chiller, for example. In another presently preferred aspect, the high level interface includes a plurality of male interface connection points for conducting electrical power used by the galley insert for normal operation. In another presently preferred aspect, the high level interface includes a plurality of male interface connection points for communicating data used by the galley insert for normal operation. In another presently preferred aspect, the high level interface is configured to allow for a floating connection between the galley insert and appliance power and control unit.

The present invention also provides for an electrical connection interface system for a galley appliance for an aircraft galley having a galley power and control unit that supplies electrical power to the galley appliance as well as operational control for the galley appliance. The electrical connection interface system includes a galley appliance, an appliance power and control unit configured to be connected to a galley power and control unit to supply electrical power and operational control to the galley appliance, and a high level interface removably connected in electrical communication with the galley appliance and configured to provide electrical power to the galley appliance and operational control of the galley appliance.

In a presently preferred aspect, the high level interface is mounted at a top rear portion of the galley appliance. In another presently preferred aspect, the galley appliance may be an oven, a refrigerator or a chiller, for example. In another presently preferred aspect, the high level interface includes a plurality of male interface connection points for conducting electrical power used by the galley appliance for normal operation. In another presently preferred aspect, the high level interface includes a plurality of male interface connection points for communicating data used by the galley appliance for normal operation. In another presently preferred aspect, the high level interface is configured to allow for a floating connection between the galley appliance and appliance power and control unit.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

The FIGURE is a perspective view of the improved electrical connection interface system for a galley insert or appliance for an aircraft galley according to the present invention.

DETAILED DESCRIPTION OF THE PREFERRED EMBODIMENTS

Referring to the drawing, which is provided for purposes of illustration and by way of example, the present invention provides for an improved electrical connection interface system for a galley insert or appliance for an aircraft galley. The electrical connection interface is preferably a common high level interface 10 connected in electrical communication with a galley insert or appliance 12, such as an oven, refrigerator or chiller, for example, and configured to provide electrical power to the galley insert or appliance as well as operational control of the galley insert or appliance. The common high level interface is in turn configured to be removably connected with an appliance power and control unit or galley power and control unit 14 of an aircraft galley (not shown), which supplies electrical power to the galley insert or appliance as well as operational control for the galley insert or appliance. The common high level interface provides male interface connection points 16 for electric, data and other such services used by a galley insert or appliance for normal operation, and is typically located at a top rear portion 18 of the galley insert or appliance, with corresponding female connectors mounted on the galley monument (not shown).

The improved electrical connection interface of the present invention allows a reduction in length and weight of internal electric cabling, electromagnetic interference protection, and data systems by significantly shortening connection lengths between an appliance power and control unit and the appliance, and by significantly shortening connection lengths between the appliance power and control unit and a galley power and control unit, and allows a galley insert or appliance to be installed and uninstalled as a conventional line replaceable unit without the need for additional tools and allows interchangeability. A galley insert or appliance may move to a limited degree with respect to the appliance power and control unit or galley power and control unit without damage or disconnection.

It will be apparent from the foregoing that, while particular forms of the invention have been illustrated and described, various modifications can be made without departing from the spirit and scope of the invention.

I claim:

1. An electrical connection interface system for a galley insert for an aircraft galley having a galley power and control unit that supplies electrical power to the galley insert as well as operational control for the galley insert, the electrical connection interface comprising:
a galley insert;
an appliance power and control unit configured to be connected to a galley power and control unit to supply electrical power and operational control to the galley insert; and
a high level interface removably connected in electrical communication with the galley insert and configured to provide electrical power to the galley insert and operational control of the galley insert.

2. The electrical connection interface of claim 1, wherein said high level interface is mounted at a top rear portion of the galley insert.

3. The electrical connection interface of claim 1, wherein said galley insert comprises an oven.

4. The electrical connection interface of claim 1, wherein said galley insert comprises a refrigerator.

5. The electrical connection interface of claim 1, wherein said galley insert comprises a chiller.

6. The electrical connection interface of claim 1, wherein said high level interface includes a plurality of male interface connection points for conducting electrical power used by the galley insert for normal operation.

7. The electrical connection interface of claim 1, wherein said high level interface includes a plurality of male interface connection points for communicating data used by the galley insert for normal operation.

8. The electrical connection interface of claim 1, wherein said high level interface is configured to allow for a floating connection between the galley insert and appliance power and control unit.

9. An electrical connection interface system for a galley appliance for an aircraft galley having a galley power and control unit that supplies electrical power to the galley appliance as well as operational control for the galley appliance, the electrical connection interface system comprising:
a galley appliance;
an appliance power and control unit configured to be connected to a galley power and control unit to supply electrical power and operational control to the galley appliance; and
a high level interface removably connected in electrical communication with the galley appliance and configured to provide electrical power to the galley appliance and operational control of the galley appliance.

10. The electrical connection interface of claim 9, wherein said high level interface is mounted at a top rear portion of the galley appliance.

11. The electrical connection interface of claim 9, wherein said galley appliance comprises an oven.

12. The electrical connection interface of claim 9, wherein said galley appliance comprises a refrigerator.

13. The electrical connection interface of claim 9, wherein said galley appliance comprises a chiller.

14. The electrical connection interface of claim 9, wherein said high level interface includes a plurality of male interface connection points for conducting electrical power used by the galley appliance for normal operation.

15. The electrical connection interface of claim 9, wherein said high level interface includes a plurality of male interface connection points for communicating data used by the galley appliance for normal operation.

16. The electrical connection interface of claim 9, wherein said high level interface is configured to allow for a floating connection between the galley appliance and appliance power and control unit.

* * * * *